No. 772,587. PATENTED OCT. 18, 1904.
W. F. STUART.
WHIFFLETREE PLATE.
APPLICATION FILED FEB. 23, 1904.
NO MODEL.
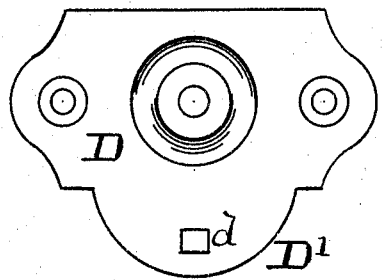
Fig. 4.
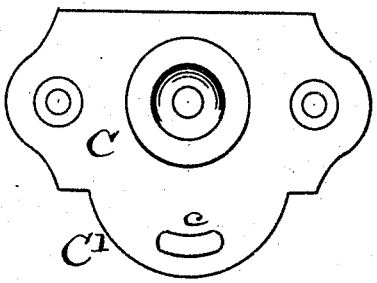
Fig. 3.
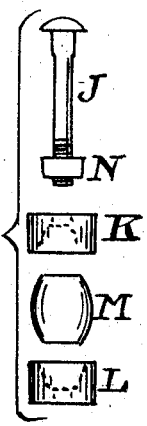
Fig. 7.
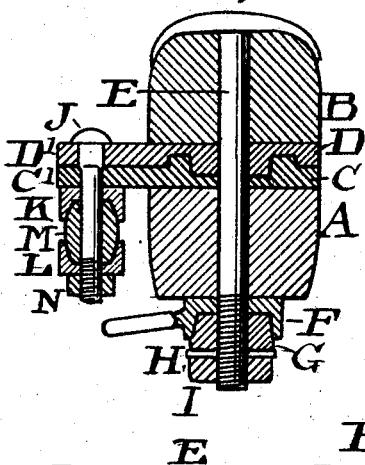
Fig. 2.
Fig. 6.
Fig. 5.
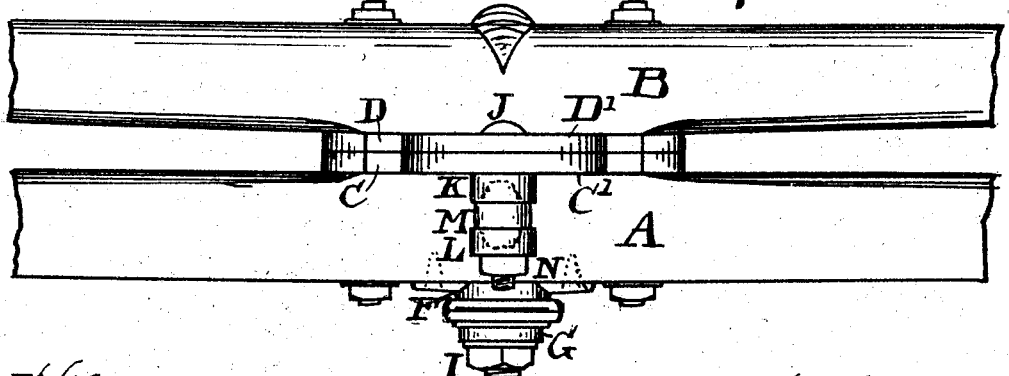
Fig. 1.
Witnesses:
Geo. B. Tibbitts,
E. A. Tibbitts
Inventor:
William F. Stuart,
per Geo. W. Tibbitts, Attorney.

No. 772,587. Patented October 18, 1904.

UNITED STATES PATENT OFFICE.

WILLIAM F. STUART, OF CLEVELAND, OHIO.

WHIFFLETREE-PLATE.

SPECIFICATION forming part of Letters Patent No. 772,587, dated October 18, 1904.

Application filed February 23, 1904. Serial No. 194,968. (No model.)

*To all whom it may concern:*

Be it known that I, WILLIAM F. STUART, of Cleveland, in the county of Cuyahoga and State of Ohio, have invented certain new and useful Improvements in Whiffletree-Plates, of which the following is a specification.

This invention relates to whiffletree-plates, and has for its object to provide for and render the plate non-rattling; and it consists in combining with the bolts that hold the two plates together rubber or elastic cushions in such a manner that as said plates become worn the wear shall be taken up, and thus obviate the annoyance of the rattling of loose parts.

In the accompanying drawings, Figure 1 is a rear side elevation of the whiffletree and the cross-bar to which it is attached, showing my attachment of rubber cushions to the bolts. Fig. 2 is a vertical cross-section through the whiffletree and cross-bar, the plates, and the bolts. Figs. 3 and 4 are face views of the upper and lower plates. Fig. 5 is a view of the rubber plate which is attached to the under side of the cross-bar and through which the main bolt passes. Fig. 6 represents the rubber cushion which sets in said plate, Fig. 5. Fig. 7 represents in detail the several parts comprising the rear bolt and its cushioning mechanism.

A represents a cross-bar, and B the whiffletree, of a pair of thills of a buggy or wagon.

C is the lower rub-plate, and D is the upper rub-plate, attached, respectively, to the cross-bar and whiffletree. To the rear side of said plate are projections C′ and D′, C having a curved slot *c* and D having a square bolthole *d*.

E is the main bolt through the whiffletree, the plates, and the cross-bar and upon which the whiffletree may turn to the extent of the curved slot in the plate C.

F is a loop-plate attached to the under side of the cross-bar and has a cavity or seat for receiving the rubber cushion G.

H is a washer, and I is a nut, holding the rubber in place.

Through the projections C′ and D′ is placed a bolt J, extending downward and having cup-shaped washers K and L, between which is placed a conical rubber cushion M, placed thereon and held in place by a nut N.

From the foregoing it will be seen that by the addition of the rubber cushions on the bolts E and J the whiffletree connections are made antirattling.

The loop-plate F is to be used on the ends of the cross-bar of a wagon-pole for attaching straps.

Having described my invention, what I claim is—

The improvement in whiffletree-plates as set forth, consisting of the combination with the cross-bar, the whiffletree, the wear-plates and the extensions thereon, and the bolts through said plates, cross-bar, and whiffletree; of the loop-plate on the under side of the cross-bar, the rubber cushion in said loop-plate, and the washer and nut holding same thereon, and the cup washers and rubber cushion between said washers, and the bolt through the plate extensions having said washers and rubber cushion thereon, arranged to operate substantially as and for the purpose specified.

In testimony whereof I have signed my name to this specification in the presence of two subscribing witnesses.

WILLIAM F. STUART.

Witnesses:
W. R. STUART,
LAURANE CRONENDERY.